(12) United States Patent
Sadasivuni

(10) Patent No.: US 11,421,882 B2
(45) Date of Patent: Aug. 23, 2022

(54) SWIRLER, COMBUSTOR ASSEMBLY, AND GAS TURBINE WITH IMPROVED FUEL/AIR MIXING

(71) Applicant: Siemens Energy Global GmbH & Co. KG, Munich (DE)

(72) Inventor: Suresh Sadasivuni, Lincoln (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 251 days.

(21) Appl. No.: 16/333,396

(22) PCT Filed: Sep. 21, 2017

(86) PCT No.: PCT/EP2017/073889
§ 371 (c)(1),
(2) Date: Mar. 14, 2019

(87) PCT Pub. No.: WO2018/060044
PCT Pub. Date: Apr. 5, 2018

(65) Prior Publication Data
US 2019/0257521 A1 Aug. 22, 2019

(30) Foreign Application Priority Data
Sep. 28, 2016 (EP) ..................... 16191044

(51) Int. Cl.
*F23R 3/14* (2006.01)
*F02C 7/22* (2006.01)
(Continued)

(52) U.S. Cl.
CPC ............... *F23R 3/14* (2013.01); *F02C 7/22* (2013.01); *F23R 3/28* (2013.01); *F23R 3/286* (2013.01);
(Continued)

(58) Field of Classification Search
CPC .... F23R 3/14; F23R 3/20; F23R 3/283; F23R 3/286
See application file for complete search history.

(56) References Cited

U.S. PATENT DOCUMENTS 6,438,961 B2 8/2002 Tuthill et al.
6,951,108 B2 10/2005 Burrus et al.
(Continued)

FOREIGN PATENT DOCUMENTS

CN 101375101 A 2/2009
CN 104764044 A 7/2015
(Continued)

OTHER PUBLICATIONS

International search report and written opinion dated Dec. 14, 2017, for corresponding PCT/EP2017/073889.

*Primary Examiner* — Arun Goyal

(57) ABSTRACT

A swirler for creating a swirling fuel/air mix having vanes extending radially around a central axis of the swirler and positioned on an annular base. The swirler has mixing channels for mixing the fuel and the air. At least one mixing channel is defined by opposing walls of two adjacent vanes. At least one of the opposing walls includes a primary side injection opening for ejecting a stream of fuel into the mixing channel; and a secondary side injection opening which corresponds to the primary side injection opening and is for ejecting a jet of fuel into the mixing channel. The secondary side injection opening is positioned on the wall such that the jet from the secondary side injection opening creates turbulence, within the mixing channel, in the stream from the primary side injection opening. The turbulence increases mixing of fuel and air.

11 Claims, 5 Drawing Sheets

(51) Int. Cl.
*F23R 3/28* (2006.01)
*F23R 3/36* (2006.01)

(52) U.S. Cl.
CPC ...... *F23R 3/36* (2013.01); *F23C 2900/07001* (2013.01)

(56) References Cited

U.S. PATENT DOCUMENTS

| | | | | |
|---|---|---|---|---|
| 8,065,880 B2* | 11/2011 | Ishizaka | | F23R 3/286 |
| | | | | 60/737 |
| 8,196,411 B2* | 6/2012 | Wilbraham | | F23R 3/14 |
| | | | | 60/748 |
| 8,302,404 B2* | 11/2012 | Nilsson | | F23D 14/70 |
| | | | | 60/748 |
| 8,393,157 B2* | 3/2013 | Dinu | | F23R 3/286 |
| | | | | 60/748 |
| 8,656,699 B2* | 2/2014 | Saito | | F23R 3/38 |
| | | | | 60/39.53 |
| 8,671,690 B2* | 3/2014 | Ishizaka | | F23R 3/14 |
| | | | | 60/734 |
| 8,925,323 B2* | 1/2015 | Zuo | | F23R 3/14 |
| | | | | 60/737 |
| 2009/0025395 A1 | 1/2009 | Nilsson et al. | | |
| 2010/0183991 A1 | 7/2010 | Koestlin et al. | | |
| 2010/0223932 A1 | 9/2010 | Wilbraham | | |

FOREIGN PATENT DOCUMENTS

| | | |
|---|---|---|
| DE | 102009038845 A1 | 3/2011 |
| EP | 2161502 A1 | 3/2010 |
| JP | 2010534782 A | 11/2010 |
| RU | 2118756 C1 | 9/1998 |
| RU | 2429413 C2 | 9/2011 |
| RU | 2435101 C2 | 11/2011 |
| RU | 2502020 C2 | 12/2013 |
| RU | 2535901 C2 | 12/2014 |
| WO | 2007131818 A1 | 11/2007 |

* cited by examiner

SWIRLER, COMBUSTOR ASSEMBLY, AND GAS TURBINE WITH IMPROVED FUEL/AIR MIXING

CROSS REFERENCE TO RELATED APPLICATIONS

This application is the US National Stage of International Application No. PCT/EP2017/073889 filed Sep. 21, 2017, and claims the benefit thereof. The International Application claims the benefit of European Application No. EP16191044 filed Sep. 28, 2016. All of the applications are incorporated by reference herein in their entirety.

FIELD OF INVENTION

The present technique relates generally to a swirler, particularly of a gas turbine, and improvements for the further diminishment of air pollutants such as nitrogen oxides ($NO_x$).

BACKGROUND OF INVENTION

In a gas turbine engine combustor fuel is combusted or burned to produce hot pressurised exhaust gases which are then fed to a turbine stage where they, while expanding and cooling, transfer momentum to turbine blades thereby imposing a rotational movement on a turbine rotor. Mechanical power of the turbine rotor can then be used to drive a generator for producing electrical power or to drive a machine. Combustion in present day gas turbine engine combustors, for example Dry Low Emissions (DLE) combustors, is initiated and maintained by using a pilot fuel and a main fuel fed at different positions of the combustor and at different stages of operation. However, burning the fuel leads to a number of undesired pollutants in the exhaust gas which are detrimental to the environment. Therefore, it is generally desired to keep the pollutants, for example nitrogen oxide ($NO_x$), carbon monoxide, etc., as low as possible.

There are two main measures by which reduction of the temperature of the combustion flame is achievable. The first is to use a lean stoichiometry with a fine distribution of fuel in the air, generating a fuel/air mix with a low fuel fraction. The relatively small fraction of fuel leads to a combustion flame with a low temperature. The second measure is to provide a thorough mixing of fuel and air before the combustion takes place. The better the mixing, the more uniformly distributed the fuel is in the combustion zone and the fewer regions exist where the fuel concentration is significantly higher than average. This helps to prevent hotspots in the combustion zone which would arise from local maxima in the fuel/air mixing ratio. With a high local fuel/air concentration, in form of rich pockets of fuel, the temperature is raised in that local area and as a result amounts of emissions, e.g. $NO_x$ in the exhaust increases.

Modern gas turbine engines therefore may use the concept of premixing air and fuel in lean stoichiometry before combustion of this fuel/air mix. Pre-mixing may take place by injecting fuel, e.g. main gas fuel, into an air stream in a swirling zone of a combustor which is located upstream from the combustion zone. The swirling leads to a mixing of fuel and air before the fuel/air mix enters the combustion zone. Even though, due to the premixing of air and fuel, generally good mixing is intended, it may occur that in operation, particularly at specific loads, of the gas turbines the mixing of fuel and air may not be as optimally desired. The fuel ejected into the incoming air stream, and intended to create a swirling fuel/air mix, may flow in more or less streamlined way along the air stream and thus proper mixing is not achieved.

EP2161502 (A1) discloses a burner having a premixing air duct extending along a burner axis, where combustion air is supplied through the duct. A swirl device e.g. swirl vane, is arranged in the duct. The device injects high calorific fuel e.g. natural gas, into the duct via an inlet stage including an inlet opening. The swirl device includes another inlet stage including an inlet opening i.e. borehole, for injecting low calorific fuel e.g. synthesis gas. A distributor opening i.e. distributor borehole, is formed with a trapezoidal surface area, where the surface area includes roundings at two sides.

DE102009038845 relates to a swirl blade comprising a first gas nozzle set and a further additional second gas nozzle set. Said nozzles are fed by a first distributor pipe and the nozzles by a second distributor pipe, the distributor pipe being integrated into the swirl blade which is embodied as two blade halves separated between the first distributor pipe and the second distributor pipe. The invention also relates to a burner and a gas turbine WO2007131818 (A1) discloses a swirler for use in a burner of a gas turbine engine, the swirler comprising a plurality of vanes arranged in a circle, flow slots being defined between adjacent vanes in the circle, each flow slot having an inlet end and an outlet end, in use of the swirler a flow of air and fuel traveling along each flow slot from its inlet end to its outlet end such that the swirler provides a swirling mix of the air and fuel, at least one vane being configured to generate a flow vortex that extends from an edge of the vane adjacent an outlet end of a flow slot to within the swirling mix thereby to improve the mix of air and fuel in the swirling mix.

SUMMARY OF INVENTION

With respect to the aforementioned state of the art it is an object of the invention to provide a swirler, in particular a swirler for a gas turbine combustion chamber, a combustor assembly equipped with such a swirler, and a gas turbine having at least one such combustor assembly that in turn includes one or more of such swirlers, so that mixing fuel and air in a swirling area is improved by providing a homogenous fuel/air mixture, especially at all possible loads of the gas turbine.

The above object is achieved by a swirler for creating a fuel/air mix, a combustor assembly equipped with such a swirler, and a gas turbine engine having at least one such combustor assembly, of the present technique. Advantageous embodiments of the present technique are provided in dependent claims.

In a first aspect of the present technique, a swirler for creating a swirling fuel/air mix is presented. The swirler having a central axis and comprising an annular array of vanes positioned on an base plate and extending around the central axis; an annular closing plate located atop the annular array of vanes. A plurality of mixing channels is formed by the annular array of vanes, the base plate and the annular closing plate for mixing the fuel and the air.

At least one mixing channel of the plurality of mixing channels is defined by opposing walls of two adjacent vanes of the plurality of vanes. At least one of the opposing walls includes at least one primary side injection opening, hereinafter also referred to as the primary opening, adapted to eject a stream of fuel into the mixing channel. The wall, having the primary side injection opening, also includes at least one secondary side injection opening, hereinafter also referred to as the secondary opening, which corresponds to the primary side injection opening. The secondary side injection opening is adapted to eject a jet of fuel into the mixing channel. The secondary side injection opening is positioned on the wall of the vane such that the jet ejected from the secondary side injection opening creates turbulence, within the mixing channel, in the stream ejected from the primary side injection opening. The turbulence increases mixing of air and fuel, particularly main gas fuel, which in turn results in diminishment of air pollutants such as nitrogen oxides ($NO_x$).

The plurality of mixing channels is arranged to direct the air (and then air and fuel mixture) in a radially inward direction with respect to the central axis. The plurality of mixing channels is further arranged to direct the air (and then air and fuel mixture) in a tangential and inward direction with respect to the central axis. Thus the air and fuel mixture is caused to swirl about the central axis and away from the base plate. The plurality of mixing channels is further arranged to direct the air (and then air and fuel mixture) parallel to the surface of the base plate while it is passing through the mixing channels.

The mixing of the fuel with the air flowing into and through the swirler to the combustion chamber is improved. Since the mixing is primarily taking place in the mixing channels, the fuel and air mixing is improved, owing to the present technique, before the fuel enters and as the fuel enters the combustion chamber. Rich pockets of fuel in the main flame region of the combustion chamber are thus reduced and in turn result into reduction in emissions. Furthermore, chances of formation of any hot spots on the can/flame-tube surface, or the burner plenum are reduced and therefore a better life of the component in or around the combustor, for example can/flame-tube surface, is achieved.

In an embodiment of the swirler, on the wall the secondary side injection opening is located radially inwards from the primary side injection opening. This provides a scheme of placement or positioning of the primary and the secondary fuel injection openings for implementation of the present technique.

In another embodiment of the swirler, a distance of the secondary side injection opening from the primary side injection opening is between 10% and 20% of a length of the wall measured, along the wall, from a radially inner thin end of the vane to a radially outer broad end of the vane. Thus the secondary fuel injection opening is positioned close to the primary fuel injection opening, with respect to the wall length which is equal to or substantially equal to length of the mixing channel, and thus the jet ejected from the secondary opening easily interacts with the stream ejected from the primary opening to create or increase turbulence in the fuel.

In another embodiment of the swirler, a vertical distance of the primary side injection opening from the annular base is equal to a vertical distance of the secondary side injection opening from the annular base. Thus the primary and the secondary openings are at same level, i.e. at same height, from the annular base, i.e. along a straight line that connects the primary opening and the secondary opening perpendicularly to the central axis. Thus the stream of fuel ejected from the primary opening and flowing radially inwards in a more or less streamlined manner passes or flows over, with respect to the wall, thus the jet from the secondary opening is easily directed into the stream of the fuel simply by the jet formed from perpendicularly, with respect to the wall, ejecting the fuel from the secondary opening.

In another embodiment of the swirler, a size of the primary side injection opening is greater than a size of the secondary side injection opening. Since the secondary opening is smaller than the primary opening, for example the secondary opening has smaller diameter compared to the primary opening, with the same supply pressure of fuel, a greater velocity of the jet is achieved. Thus, the jet possesses greater momentum and creates greater disturbance, and thus better turbulence, in the stream of fuel from the primary opening.

In another embodiment of the swirler, the wall includes at least a first primary side injection opening and a second primary side injection opening. The wall also includes at least a first secondary side injection opening corresponding to the first primary side injection opening, and a second secondary side injection opening corresponding to the second primary side injection opening. Thus, more than one streams are introduced and more than one corresponding jets are injected, into the mixing channel, to create increased turbulence.

In another embodiment of the swirler, on the wall, the first primary side injection opening and the second primary side injection opening are positioned axially spaced apart. A horizontal distance of the first primary side injection opening from a radially inner thin end of the vane of the swirler is equal to a horizontal distance of the second primary side injection opening from the radially inner thin end of the vane of the swirler. In another embodiment of the swirler, on the wall, the first secondary side injection opening and the second secondary side injection opening are positioned axially spaced apart. A horizontal distance of the first secondary side injection opening from the radially inner thin end of the vane of the swirler is equal to a horizontal distance of the second secondary side injection opening from the radially inner thin end of the vane of the swirler. Thus the two primary openings and the two corresponding secondary openings are positioned such that the jets from the secondary openings can induce or increase turbulence in the corresponding streams from the primary openings.

In another embodiment of the swirler, from the annular base, a vertical distance of the first primary side injection opening is equal to a vertical distance of the first secondary side injection opening corresponding to the first primary side injection opening. In the embodiment, from the annular base, a vertical distance of the second primary side injection opening is equal to a vertical distance of the second secondary side injection opening corresponding to the second primary side injection opening. Thus the two primary openings and the two corresponding secondary openings are horizontally aligned. The streams of fuel ejected from the primary openings and flowing radially or horizontally inwards flow over the corresponding secondary openings and thus the jets from the secondary openings are easily directed into the corresponding streams of the fuel simply by the jets formed from perpendicularly, with respect to the wall, ejecting the fuel.

In another embodiment of the swirler, the vane, having the one or more of the primary side injection openings and the one or more of the corresponding secondary side injection holes, includes a fuel supply gallery adapted to supply fuel to the one or more of the primary side injection openings and to the one or more of the corresponding secondary side injection openings. Thus the fuel can be supplied to the primary and the secondary openings by using the same fuel supply gallery, and this makes the vanes simple in construction.

In another embodiment of the swirler, the vane, having the one or more of the primary side injection openings and the one or more of the corresponding secondary side injection openings, includes a first fuel supply gallery and a second fuel supply gallery. The first fuel supply gallery is adapted to supply fuel to the one or more of the primary side injection openings. The second fuel supply gallery is adapted to supply fuel to the one or more of the corresponding secondary side injection openings. Within the vane the second fuel supply gallery is fluidly separate from the first fuel supply gallery. Thus the fuel is supplied to the primary and the secondary opening(s) by using different fuel supply galleries. Since the fuel supply galleries are not fluidly connected within the vane the fuels can be supplied to the primary and the secondary openings at different pressures. This also enables selective use of the primary and the secondary openings i.e. only the primary opening(s) may be supplied with the fuel using the first fuel supply gallery, or both the primary and the secondary openings may be supplied by fuel, thus enabling a selective turbulence creation as and when desired.

In a second aspect of the present technique, a combustor assembly for a gas turbine engine is presented. The combustor assembly includes a combustion chamber and a swirler. The combustion chamber has a longitudinal axis. The swirler is as described according to the first aspect of the present technique. The swirler is arranged such that central axis of the swirler is aligned with the longitudinal axis of the combustion chamber. The combustor assembly of the present technique has the same advantages as the abovementioned aspect of the present technique.

In a third aspect of the present technique, a gas turbine engine is presented. The gas turbine engine includes at least one combustor assembly. The combustor assembly is as described according to the second aspect of the present technique. The gas turbine engine of the present technique has the same advantages as the abovementioned second aspect of the present technique.

BRIEF DESCRIPTION OF THE DRAWINGS

The above mentioned attributes and other features and advantages of the present technique and the manner of attaining them will become more apparent and the present technique itself will be better understood by reference to the following description of embodiments of the present technique taken in conjunction with the accompanying drawings, wherein.

DETAILED DESCRIPTION OF INVENTION

Figure 1:
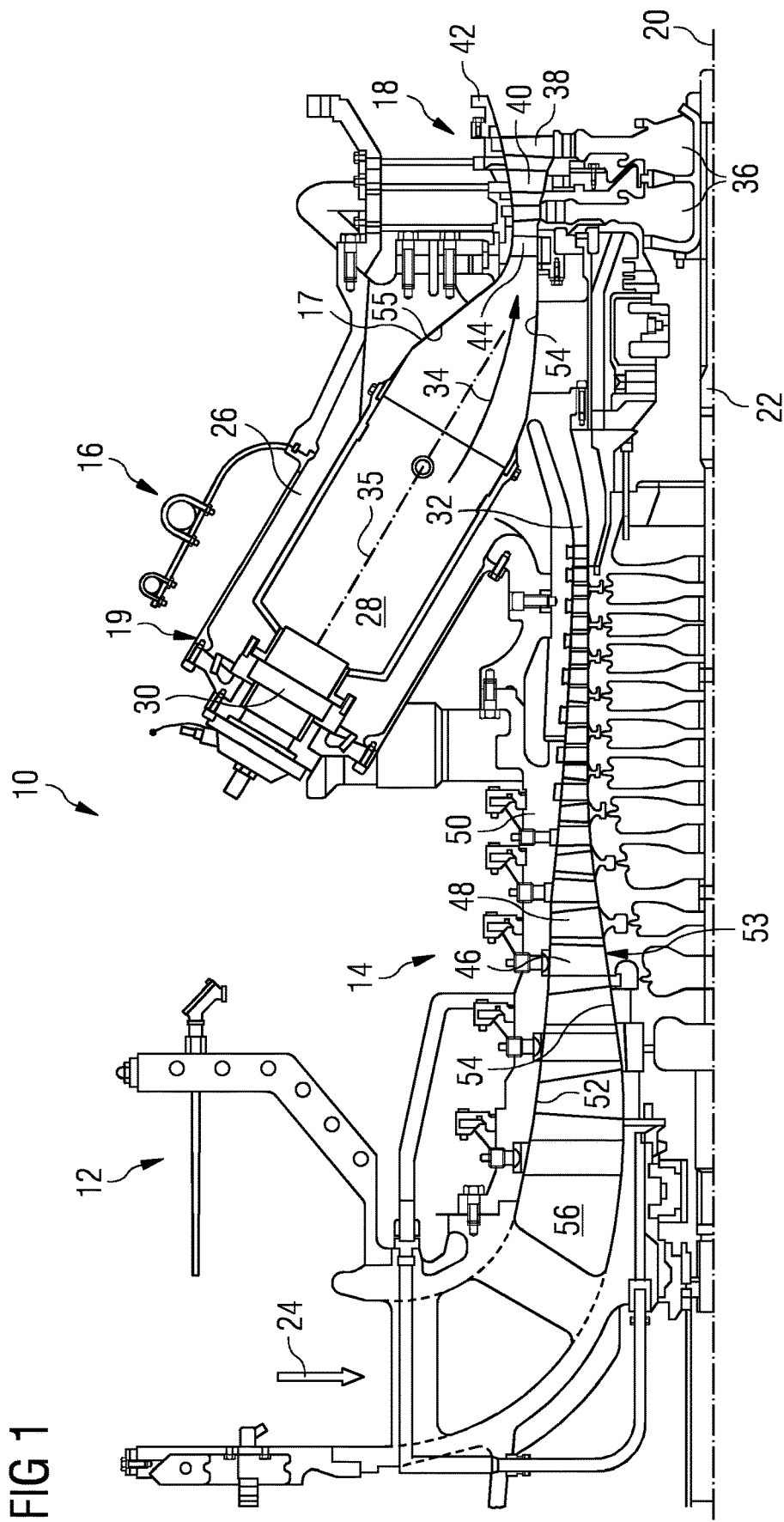
FIG. 1 shows part of an exemplary embodiment of a gas turbine engine in a sectional view and in which an exemplary embodiment of a swirler and an exemplary embodiment of a combustor assembly of the present technique are incorporated.

Hereinafter, above-mentioned and other features of the present technique are described in details. Various embodiments are described with reference to the drawing, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

FIG. 1 shows an example of a gas turbine engine 10 in a sectional view. The gas turbine engine 10 comprises, in flow series, an inlet 12, a compressor or compressor section 14, a combustor section 16 and a turbine section 18 which are generally arranged in flow series and generally about and in the direction of a rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor section 14 and delivered to the combustion section or burner section 16. The burner section 16 comprises a burner plenum 26, one or more combustion chambers 28 extending along a longitudinal axis 35 and at least one burner 30 fixed to each combustion chamber 28. The combustion section 16 may comprise more than one burner 30 along with a swirler 1 (not shown in FIG. 1, shown in FIGS. 2 and 3). The longitudinal axis 35 passes through center of the swirler. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channelled through the combustion chamber 28 to the turbine section 18 via a transition duct 17.

This exemplary gas turbine engine 10 has a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. An annular array of transition duct outlets form an annulus for channelling the combustion gases to the turbine 18.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 44 are provided and turn the flow of working gas onto the turbine blades 38.

The combustion gas 34 from the combustion chamber 28 enters the turbine section 18 and drives the turbine blades 38 which in turn rotate the shaft 22. The guiding vanes 40, 44 serve to optimise the angle of the combustion or working gas 34 on the turbine blades 38.

The turbine section 18 drives the compressor section 14. The compressor section 14 comprises an axial series of vane stages 46 and rotor blade stages 48. The rotor blade stages 48 comprise a rotor disc supporting an annular array of blades. The compressor section 14 also comprises a casing 50 that surrounds the rotor stages and supports the vane stages 48. The guide vane stages include an annular array of radially extending vanes that are mounted to the casing 50. The vanes are provided to present gas flow at an optimal angle for the blades at a given engine operational point. Some of the guide vane stages have variable vanes, where the angle of the vanes, about their own longitudinal axis, can be adjusted for angle according to air flow characteristics that can occur at different engine operations conditions.

The casing 50 defines a radially outer surface 52 of the passage 56 of the compressor 14. A radially inner surface 54 of the passage 56 is at least partly defined by a rotor drum 53 of the rotor which is partly defined by the annular array of rotor blade stages 48.

The present technique is described with reference to the above exemplary turbine engine having a single shaft or spool connecting a single, multi-stage compressor and a single, one or more stage turbine. However, it should be appreciated that the present technique is equally applicable to two or three shaft engines and which can be used for industrial, aero or marine applications. Furthermore, the cannular combustor section arrangement 16 is also used for exemplary purposes and it should be appreciated that the present technique is equally applicable to annular type and can type combustion chambers. The terms axial, radial and circumferential as used hereinafter are made with reference to a central axis 9 (shown in FIG. 2) of the swirler 1 (shown in FIG. 2). The swirler 1 of the present technique, and/or a combustor assembly 100 of the present technique is incorporated in the gas turbine engine 10 of FIG. 1.

Figure 2:
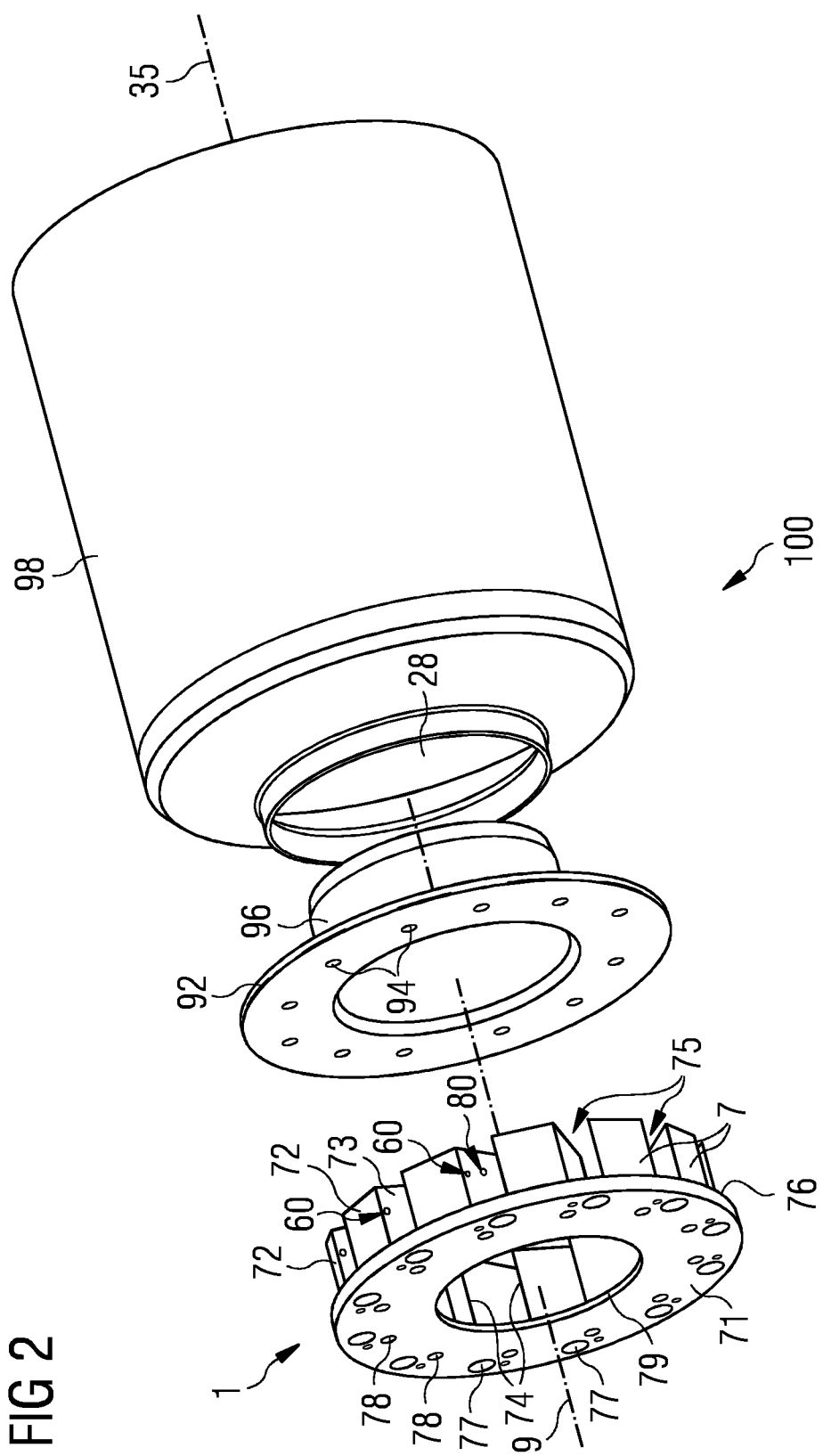
FIG. 2 schematically illustrates an exploded view of an exemplary embodiment of the combustor assembly including an exemplary embodiment of the swirler of the present technique.

FIG. 2 schematically shows an exploded view of an exemplary embodiment of the combustor assembly 100 including an exemplary embodiment of the swirler 1 of the present technique. It may be noted that the swirler 1 and/or combustor assembly 100 generally may include more parts, and in FIG. 2 only those parts or components have been depicted that are important for understanding of the present technique.

The combustor assembly 100, hereinafter referred to as the assembly 100, includes a burner (not shown), the swirler 1 for example a radial swirler 1, having swirler vanes 7, generally wedge shaped or pie-slice shaped, positioned on an annular base 76 around the central axis 9 of the swirler 1 for creating a swirling mix of a fuel and air, hereinafter also referred to as the fuel/air mix. The annular base 76 is a side of the annular or circular base plate 71. It should be appreciated that where the base plate 71 is annular or ring shaped, a pilot burner is inserted into the ring. The pilot burner seals against the ring and thus no air, other than pilot air, enters into the swirler region. Furthermore the assembly 100 includes an annular closing plate 92 to which the swirler vanes 7 of the swirler 1 are attached and a combustion chamber 28 defined by a combustion casing 98, and optionally a transition piece referred to as a pre-chamber 96 located between the swirler 1 and combustion casing 98. The combustion chamber 28 has a diameter larger than the diameter of the pre-chamber 96. The combustion chamber 28 may be connected to the pre-chamber 96 via a dome portion (not shown) comprising a dome plate (not shown). In general, the transition piece 17 or the pre-chamber 96 may be implemented as a one part continuation of the combustion casing or flametube 98 towards the pilot burner, or as a separate part between the pilot burner and the combustion casing or the flametube 98. The swirler 1 and the combustion chamber 28 show substantially rotational symmetry about the longitudinal axis 35. In general, the longitudinal axis 35 is the axis of symmetry for the combustor assembly 100 and its components including the swirler 1. The central axis 9 of the swirler 1 is aligned with the longitudinal axis 35 in the combustor assembly 100, i.e. the longitudinal axis 35 passes through the central axis 9 of the swirler 1.

Figure 3:
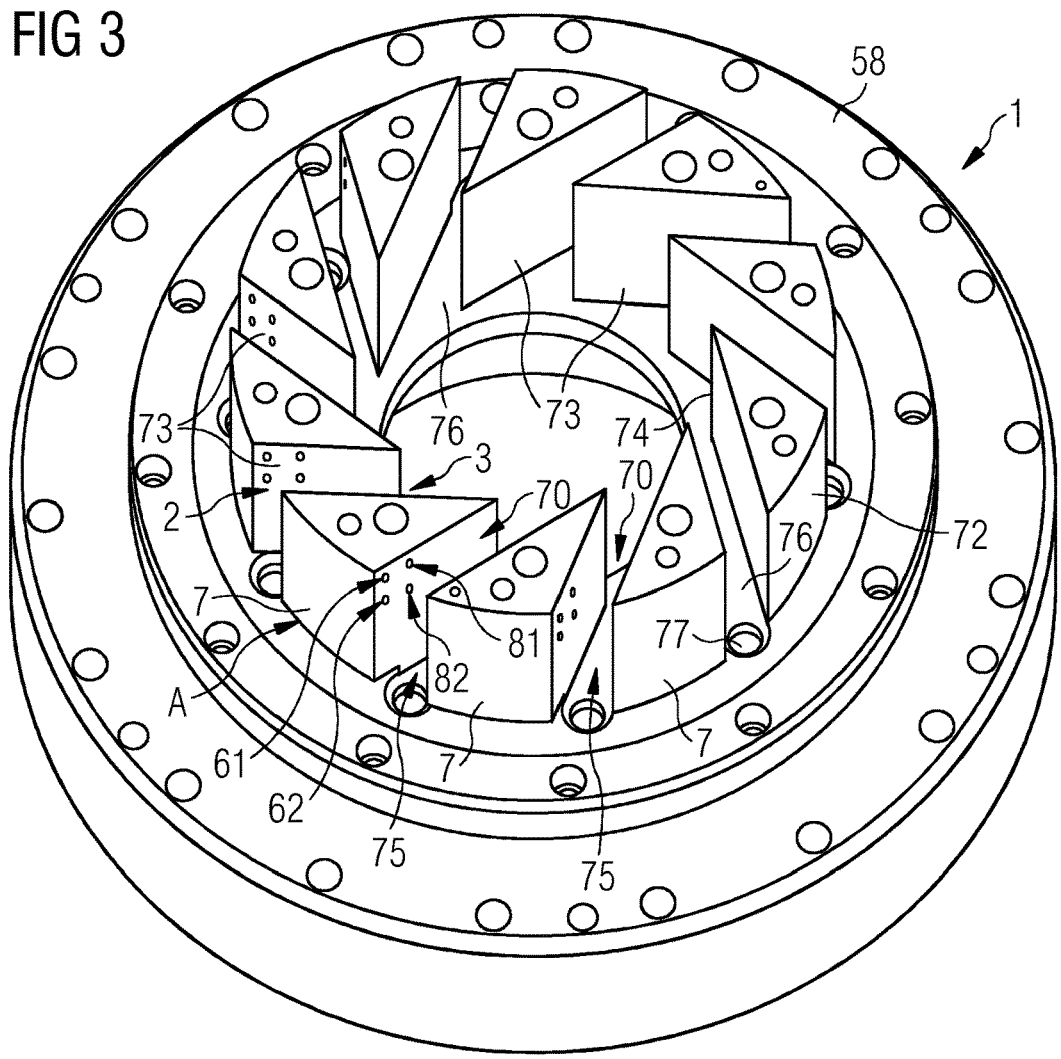
FIG. 3 schematically illustrates a perspective view of the swirler of the combustor assembly of FIG. 2.

As shown in FIG. 3 in combination with FIG. 2, in the swirler 1, a plurality, for example twelve, of the swirler vanes 7 are arranged circumferentially spaced around annular base plate 71, particularly on the annular base 76, so as to form, between adjacent swirler vanes 7, mixing channels or slots 75. The annular base plate 71 includes at the radially outer end of each slot 75 a base injection holes 77 by means of which main fuel is supplied to the swirler 1. Each swirler vane 7 additionally include at the radially outer end of a side 73 or a wall 73 thereof one or more side injection holes by means of which main fuel is also supplied to the swirler 1. One side injection hole per wall 73, hereinafter also referred to as primary side injection opening 60 or hole 60, has been shown in embodiment of the swirler 1 depicted in FIG. 2, whereas two side injection holes per wall 73, both of which are primary side injection openings 60, however hereinafter are also referred to as first primary side injection opening 61 or hole 61 and second primary side injection opening 62 or hole 62, are depicted in the embodiment of the swirler 1 shown in FIG. 3. A further embodiment of the swirler 1 with more than two primary side injection openings 60 is possible and is well within the scope of the present technique.

Furthermore, the wall 73 of the vane 7 of the swirler 1 includes thereof one or more additional side injection holes by means of which main fuel is also supplied to the swirler 1. One such side injection hole per wall 73, hereinafter also referred to as secondary side injection opening 80 or hole 80, has been shown in embodiment of the swirler 1 depicted in FIG. 2, whereas two side injection holes per wall 73, both of which are secondary side injection openings 80, however hereinafter are also referred to as first secondary side injection opening 81 or hole 81 and second secondary side injection opening 82 or hole 82, are depicted in the embodiment of the swirler 1 shown in FIG. 3. A further embodiment of the swirler 1 with more than two secondary side injection openings 80 is possible and is well within the scope of the present technique. In an exemplary embodiment of the swirler 1, a number of the holes 80 corresponds to a number of the holes 60, i.e. if there are two holes 60, for example the hole 61 and the hole 62 of FIG. 3, the wall 73 of the vane 7 of the swirler 1 also includes two holes 80, for example the hole 81 and the hole 82.

A plurality of fixing holes 78 extend through swirler vanes 7 and the base plate 71 through which the swirler vanes 7 are fixed on the base plate 71, as shown in FIG. 2. Alternatively, the swirler vanes 7 may be integrally formed, i.e. as one part extension, with the base plate 71. Generally, the base plate 71 is fixed onto an adapter plate (not shown) positioned annularly around the burner 30 (of FIG. 1), however the swirler 1 along with the swirler vanes 7 may be positioned in the assembly 100 by supporting the swirler 1 on other components (not shown). As seen in FIG. 3, each swirler vane 7 has a thin end 74 that has a radially inner position, and an oppositely positioned broad end 72.

As shown in FIG. 2, the pre-chamber 96 is cylindrical in form and may be formed integrally with annular closing plate 92 or may be attached to the annular closing plate 92 through an intermediate component (not shown). Thus, on one face of the annular closing plate 92 the swirler vanes 7 are attached, through a plurality of fixing holes 94 included in the annular closing plate 92 aligned with the fixing holes 78 of the swirler vanes 7 by using nuts and bolts (not shown), and on the other face of the annular closing plate 92 the pre-chamber 96 is integrally formed or attached through an intermediate piece (not shown). It may be noted that the assembly of the swirler 1, the swirler vanes 7, the annular closing plate 92 and the pre-chamber 96 shown in FIG. 2 of the present disclosure are for exemplary purposes only and that there may be other pieces or components, such as other annular plates (not shown) that connect one component to another, for example the swirler vanes 7 may be connected or integrally formed with a top plate (not shown) which may then be connected to the annular closing plate 92.

As shown in FIG. 3, air is supplied to a radially outer inlet end 2 of slots 75 of the swirler 70 and travels generally radially inwardly along slots 75 confined between two adjacent swirler vanes 7 on the sides, the annular base 76 at the bottom, and a top region 70 that may be formed by the face of the annular closing plate 92 facing the swirler vanes 7. Main fuel is supplied to the base injection holes 77, to the primary side injection openings 60, 61, 62, and to the secondary side injection openings 80, 81, 82 all of which open in the slots 75, so as to enter slots 75 and mix with the air travelling along slots 75 radially inwards. The air and the fuel ejected by the holes 77, holes 60, 61, 62 and the holes 80, 81, 82 exits the slots 75 through a radially inner outlet end 3 of the slots 75. Thus, the swirler 1 creates a swirling mix of fuel/air in an annular region immediately radially inward of the outlet ends 3 of the slots 75 and also in within the slots 75. This swirling mix travels axially along the assembly 100 to combustion chamber 28, passing through the annular closing plate 92, and pre-chamber 96.

Hereinafter, the positioning, on the wall 73 of the vane 7, and function of one or more of the primary side injection openings 60, 61, 62 and their corresponding one or more of the secondary side injection openings 80, 81, 82 are explained in further details with reference to FIGS. 4, 5, 6 and 7 in combination with FIG. 3.

Figure 4:
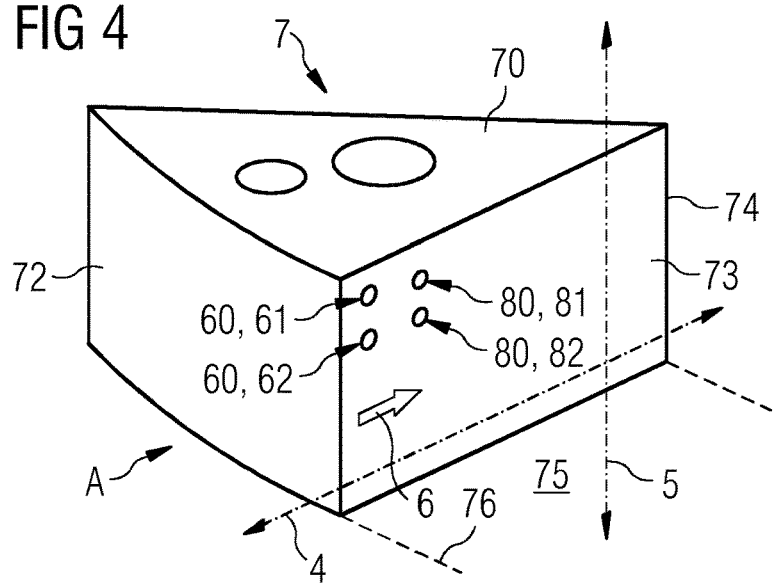
FIG. 4 schematically illustrates a perspective view of a vane of the swirler of FIG. 3.

FIG. 4 schematically depicts one vane 7 of the swirler 1. The vane 7 depicted in FIG. 4 is the vane 7 marked as 'A' in FIG. 3 for ease of understanding. As shown in FIG. 4, the two primary holes 60, i.e. the hole 61 and the hole 62, are positioned on the wall 73 of the vane 7. Each of the holes 61, 62 has a corresponding secondary hole 80, i.e. the hole 81 corresponding to the hole 61 and the hole 82 corresponding to the hole 62. The holes 61, 62 are generally placed towards the top 70 of the vane 7. For example distance of each of the holes 61 and 62, i.e. the hole 60, from the annular base 76 is between 65% and 91% of a distance of the top 70 of the vane 7 from the annular base 76, measured along the wall 73. The corresponding holes 81 and 82 are also positioned towards the top 70 of the vane 7. Furthermore, the holes 61, 62 are generally placed radial outwards i.e. towards the broad outer end 72 of the vane 7, as compared to the corresponding holes 81 and 82 of the vane 7. A direction of flow of air has been depicted by an arrow marked 6 in the FIG. 4. In later FIGS., specifically FIGS. 5, 6 and 7, positioning of the holes 61, 62 and the corresponding holes 81 and 82 has been expressed in terms of horizontal distances and vertical distances. Axis 4 represents a direction along which the horizontal distances are measured i.e. along the wall 73 and from the thin end 74 of the vane 7. Axis 5 represents a direction along which the vertical distances are measured i.e. along the wall 73 and from the annular base 76 of the slot 75. The axis 4 and the axis 5 are generally perpendicular to each other and the axis 5 is generally perpendicular to the annular base 76.

Figure 5:
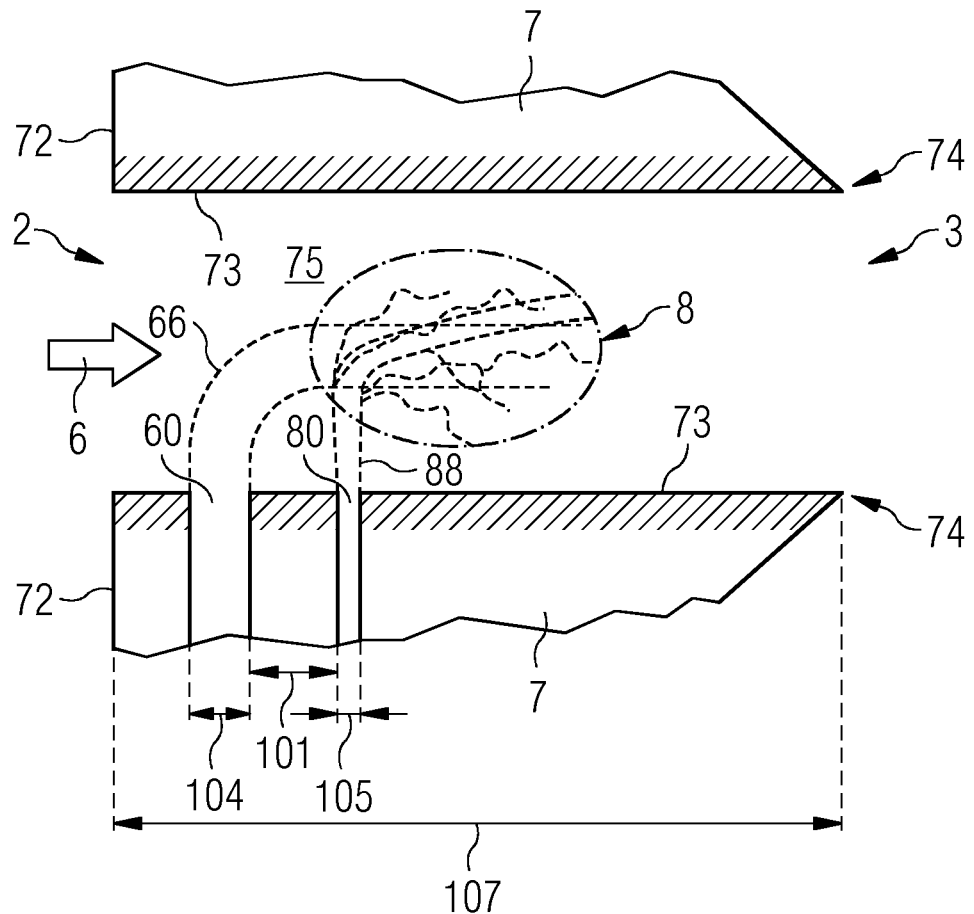
FIG. 5 schematically illustrates a top view of adjacent vanes of an exemplary embodiment of the swirler depicting schematically a working of the swirler of the present technique.

FIG. 5 has been referred to hereinafter to further explain positioning and functioning of the hole 60 and the hole 80, which is applicable also to positioning and functioning of the holes 61, 62 and the holes 81, 82 of FIG. 4. FIG. 5 shows opposing walls 73 of two adjacent vanes 7 of the swirler 1 that form the slot 75. The adjacent vanes 7 depicted in FIG. 5 are from the plurality of vanes 7, depicted in FIGS. 2 and 3, and are positioned on the annular base 76 and extend radially around the central axis 9 of the swirler 1, as shown in FIG. 2. One of the opposing walls 73 has the primary side injection opening 60 i.e. the hole 60. During operation of the swirler 1, i.e. during operation of the gas turbine engine 10, from the hole 60 a stream 66 of fuel is ejected into the mixing channel 75 or the slot 75. The stream 66 after being ejected from the hole 60 turns and flows along with the air 6, coming from the outer inlet end 2, and flowing towards the inner outlet end 3. The same wall 73 has the secondary side injection opening 80, i.e. the hole 80, corresponding to the hole 60. From the hole 80 a jet 88 of fuel is ejected into the slot 75. The jet 88 after being ejected from the hole 80 also turns and flows along with the air 6, coming from the outer inlet end 2, towards the inner outlet end 3.

However, the hole 80 is positioned on the wall 73 of the vane 7 in such a way that the jet 88 hits or plunges into or thrusts into the stream 66 and thereby creates turbulence 8 in the stream 66. The turbulence 8 is created where the jet 88 thrusts into or mixes with the stream 66. The turbulence 8 continues to propagate downstream i.e. towards the outlet end 3 of the slot 75. The turbulence 8 promotes mixing of the fuel coming from the hole 60 and the hole 80 with the air 6. The turbulence 8, i.e. the disruption or turmoil, spreads in the slot 75 and also promotes mixing of the fuel coming from the hole 77 (shown in FIG. 3) with the air 6.

To promote thrusting of the jet 88 into the stream 66, the hole 80 is located radially inwards from the primary side injection opening 60. However, in another embodiment (not shown) of the swirler 1, the hole 80 may not be radially inwards as compared to the hole 60 and may be present at the same radial distance as the hole 60 but the jet 88 may be ejected angularly towards the stream 66 to cause the thrusting of the jet 88 into the stream 66. Furthermore, to promote or facilitate the mixing of the jet 88 with the stream 66, while the jet 88 still has substantial momentum, the hole 80 is placed in vicinity of the hole 60, for example, the hole 60 and the hole 80 are placed or positioned on the wall 73 such that a distance 101 between the hole 60 and the hole 80 is between 10% and 20% of a length 107 of the wall 73. The length 107 is the distance between the broad outer end 72 of the vane 7 and the thin inner end 74 of the vane 7 and is measured along the wall 73. In another embodiment the distance 107 may be even lesser, for example between 5% and 10% of the length 107 of the wall 73. Furthermore, a distance of the hole 60 from the inner thin end 74 of the wall 73 is between 85% and 95% of the length of the wall 73.

In an embodiment of the swirler 1, the hole 80 is smaller than the hole 60, i.e. a size 104 for example diameter of the hole 60 is greater than a size 105, for example the diameter of the hole 80. With smaller diameter of the hole 80, the ejected jet 88 will have more momentum even if the pressure at which fuel is supplied to the hole 80 is same as the pressure at which the fuel is supplied to hole 60. For example the size 105 of the hole 80 is between 50% and 70% of the size 104 of the hole 60.

Figure 6:
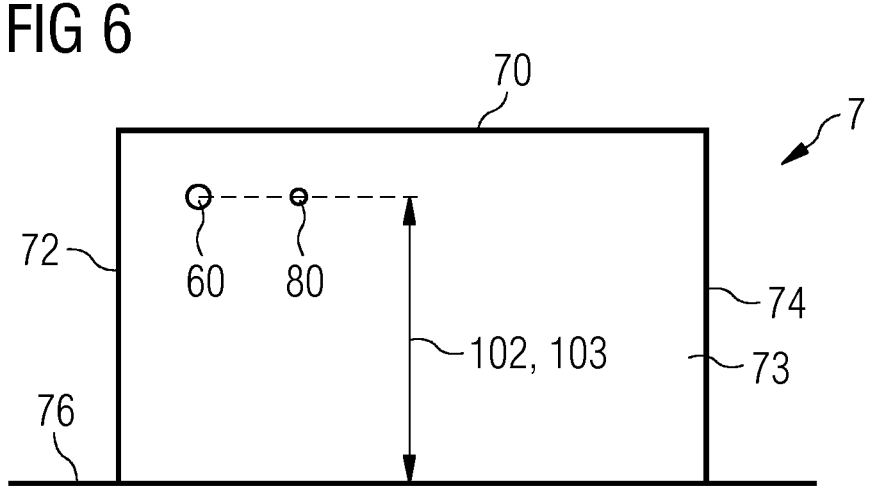
FIG. 6 schematically illustrates scheme of arrangement of a primary and a secondary side injection openings on a wall of the vane of the swirler.

FIG. 6 shows placement of the hole 60 and the hole 80, when only one of each is present on the wall 73, for example as in the swirler 1 shown in FIG. 2. In this embodiment of the swirler 1, a vertical distance 102 of the hole 60 from the annular base 76 is equal to or same as a vertical distance 103 of the hole 80 from the annular base 76. It may be noted that vertical distances 102, 103 may either be measured from centers (not shown) or geometric centers (not shown) of the hole 60 and the hole 80, respectively, or may be measured from an edge or boundary of the holes 60, 80 such that the holes 60, 80 are contiguous with but limited within the measured distances 102, 103.

Figure 7:
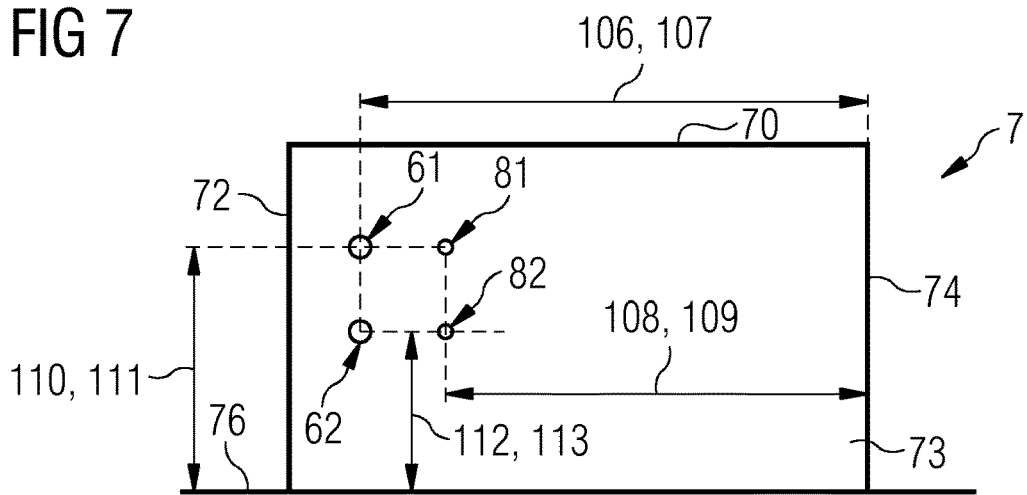
FIG. 7 schematically illustrates another scheme of arrangement of a plurality of primary side injection openings and a plurality of secondary side injection openings on the wall of the vane of the swirler.

FIG. 7 shows placement of the hole 60 and the hole 80, when more than one of each is present on the wall 73, for example say two holes 60 i.e. the holes 61, 62 and two holes 80 i.e. the holes 81, 82, as in the swirler 1 shown in FIGS. 3 and 4. In one embodiment of the swirler 1, the hole 61 and the hole 62 are positioned axially spaced apart i.e. the hole 61 is on top of or above the hole 62 in axial direction, i.e. along or parallel to the axis 5 of FIG. 4. For example a distance between the holes 61 and 62 is between 10% and 30% of the distance of the top 70 of the vane 7 from the annular base 76. Furthermore, in this embodiment of the swirler 1, a horizontal distance 106 of the hole 61 from the inner thin end 74 of the vane 7 is equal to or same as a horizontal distance 107 of the hole 62 from the inner thin end 74 of the vane 7, i.e. the hole 61 is exactly above of the hole 62 on the wall 73 with respect to the annular base 76 i.e. in the direction represented by axis 5 in FIG. 4.

In related embodiment, as shown in FIG. 7, of the swirler 1, the hole 81 and the hole 82 are also axially spaced apart i.e. the hole 81 is on top of or above the hole 82 in axial direction, i.e. along or parallel to the axis 5 of FIG. 4. Furthermore, in this embodiment of the swirler 1, a horizontal distance 108 of the hole 81 from the inner thin end 74 of the vane 7 is equal to or same as a horizontal distance 109 of the hole 82 from the inner thin end 74 of the vane 7, i.e. the hole 81 is exactly above of the hole 82 on the wall 73 with respect to the annular base 76 i.e. in the direction represented by axis 5 in FIG. 4.

In a further embodiment of the swirler 1, as depicted in FIG. 7, a vertical distance 110 of the hole 61 from the annular base 76 is equal to or same as a vertical distance 111 of the hole 81 from the annular base 76, i.e. the hole 81 is at side of and same level as the hole 61 in horizontal direction, i.e. along or parallel to the axis 4 of FIG. 4. Furthermore, in this embodiment of the swirler 1, a vertical distance 112 of the hole 62 from the annular base 76 is equal to or same as a vertical distance 113 of the hole 82 from the annular base 76 i.e. the hole 82 is at side of and same level as the hole 62 in horizontal direction, i.e. along or parallel to the axis 4 of FIG. 4.

It may be noted that vertical distances 110, 111, 112 and 113 may either be measured from centers (not shown) or geometric centers (not shown) of the hole 61, the hole 81, the hole 62 and the hole 82, respectively, or may be measured from an edge or boundary of the holes 61, 81, 62, 82 such that the holes 61, 81, 62, 82 are contiguous with but limited within the measured vertical distances 110, 111, 112 and 113. Similarly, it may be noted that horizontal distances 106, 107, 108 and 109 may either be measured from centers (not shown) or geometric centers (not shown) of the hole 61, the hole 62, the hole 81 and the hole 82, respectively, or may be measured from an edge or boundary of the holes 61, 62, 81, 82 such that the holes 61, 62, 81, 82 are contiguous with but limited within the measured horizontal distances 106, 107, 108 and 109.

Figure 8:
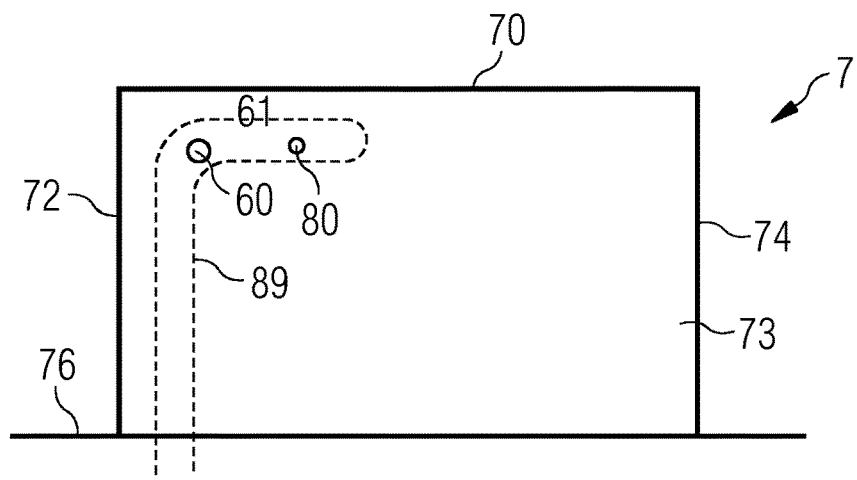
FIG. 8 schematically illustrates a scheme of fuel supply gallery in the vane of the swirler.
Figure 9:
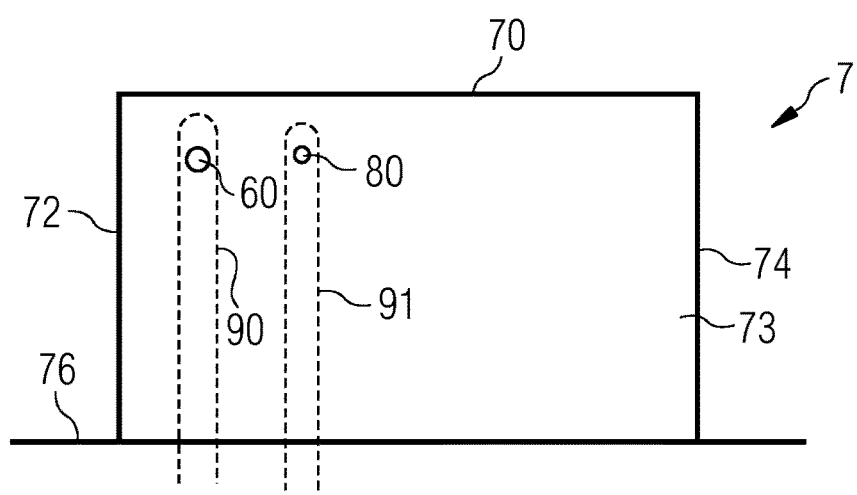
FIG. 9 schematically illustrates another scheme of fuel supply galleries in the vane of the swirler; in accordance with aspects of the present technique.

FIGS. 8 and 9, hereinafter schematically represent two embodiments of the swirler 1 showing different ways of supplying fuel to the hole 60 and the hole 80 of the vane 7. As shown in FIG. 8, in the swirler 1, the vane 7 includes a fuel supply gallery 89. The fuel supply gallery 89 generally supplies fuel, for example gas fuel, to both the holes 60 and 80. Alternately, as shown in FIG. 9, in the swirler 1, the vane 7 includes two separate fuel supply galleries, namely a first fuel supply gallery 90 that generally supplies gas fuel to the hole 60 and a second fuel supply gallery 91 that generally supplies gas fuel to the hole 80. The galleries 90 and 91 are not fluidly connected within the vane 7, i.e. the galleries 90 and 91 are fluidly separate from each other, meaning that the fuel flowing through the gallery 90 to the hole 60 is at all times separated within the vane 7 from the fuel flowing through the gallery 91 to the hole 80. The galleries 90 and 91 can have flow control mechanisms or techniques associated with them, for example flow valves, flow meters, etc. and thereby amounts of fuel ejected via the hole 60 in form of the stream 66 and via the hole 80 in form of the jet 88 are independently variable. The construction and functioning of fuel supply galleries in vanes 7 of swirlers 1, and similarly structure and functioning of flow through fuel galleries, are generally known in the art of gas turbines 10 and other related arts and thus not explained herein in further details for sake of brevity.

While the present technique has been described in detail with reference to certain embodiments, it should be appreciated that the present technique is not limited to those precise embodiments. It may be noted that, the use of the terms 'first', 'second', etc. does not denote any order of importance, but rather the terms 'first', 'second', etc. are used to distinguish one element from another. Rather, in view of the present disclosure which describes exemplary modes for practicing the invention, many modifications and variations would present themselves, to those skilled in the art without departing from the scope of this invention. The scope of the invention is, therefore, indicated by the following claims rather than by the foregoing description. All changes, modifications, and variations coming within the meaning and range of equivalency of the claims are to be considered within their scope.

The invention claimed is:

1. A swirler for creating a fuel/air mix, the swirler having a central axis and comprising:
   an annular array of vanes positioned on a base plate and extending around the central axis;
   an annular closing plate located atop the annular array of vanes;
   a plurality of mixing channels formed by the annular array of vanes, the base plate and the annular closing plate for mixing the fuel and the air,
   at least one mixing channel of the plurality of mixing channels defined by opposing walls of two adjacent vanes of the plurality of vanes, wherein each vane of the two adjacent vanes have a radially outer broad end and a radially inner thin end, wherein at least one wall of the opposing walls comprises at least one primary side injection opening adapted to eject a stream of fuel into the mixing channel, and at least one secondary side injection opening corresponding to the primary side injection opening and adapted to eject a jet of fuel into the mixing channel, wherein the at least one secondary side injection opening is positioned on the at least one wall such that the jet ejected from the at least one secondary side injection opening interacts with the jet ejected from the at least one primary side injection opening and creates turbulence, within the mixing channel, in the stream ejected from the at least one primary side injection opening, wherein the at least one secondary side injection opening is located radially inwards from the at least one primary side injection opening, wherein a distance of the at least one secondary side injection opening from the at least one primary side injection opening is in a range defined by one of the following: 1) between 10% and 20% of a length of the at least one wall measured along the at least one wall from the radially inner thin end to the radially outer broad end; 2) between 5% and 10% of the length of the at least one wall measured along the at least one wall from the radially inner thin end to the radially outer broad end, wherein a size of the at least one primary side injection opening is greater than a size of the at least one secondary side injection opening, and wherein a first distance in a first direction from the base plate is same for the at least one primary side injection opening and the at least one secondary side injection opening.

2. The swirler according to claim 1, wherein the wall comprises a first primary side injection opening and a second primary side injection opening of the at least one primary side injection opening, and a first secondary side injection opening corresponding to the first primary side injection opening; and a second secondary side injection opening corresponding to the second primary side injection opening.

3. The swirler according to claim 2, wherein on the wall the first primary side injection opening and the second primary side injection opening are positioned axially spaced apart and wherein a second distance in a second direction perpendicular to the first direction of the first primary side injection opening from a radially inner thin end of the vane of the swirler is equal to a third distance in the second direction of the second primary side injection opening from the radially inner thin end of the vane of the swirler.

4. The swirler according to claim 3, wherein on the wall the first secondary side injection opening and the second secondary side injection opening are positioned axially spaced apart and wherein a fourth distance in the second direction of the first secondary side injection opening from the radially inner thin end of the vane of the swirler is equal to a fifth distance in the second direction of the second secondary side injection opening from the radially inner thin end of the vane of the swirler.

5. The swirler according to claim 4, wherein from the base plate, a sixth distance in the first direction of the first primary side injection opening is equal to a seventh distance in the first direction of the first secondary side injection opening corresponding to the first primary side injection opening; and from the base plate, an eight distance in the first direction of the second primary side injection opening is equal to a ninth distance in the first direction of the second secondary side injection opening corresponding to the second primary side injection opening.

6. The swirler according to claim 1, wherein the vane, having the at least one primary side injection opening and the at least one corresponding secondary side injection opening, comprises a fuel supply gallery adapted to supply fuel to the at least one primary side injection opening and to the at least one corresponding secondary side injection opening.

7. The swirler according to claim 1, wherein the vane, having the at least one primary side injection opening and the at least one corresponding secondary side injection opening, comprises:

a first fuel supply gallery adapted to supply fuel to the at least one primary side injection opening; and a second fuel supply gallery adapted to supply fuel to the at least one corresponding secondary side injection opening, and wherein within the vane the second fuel supply gallery is fluidly separate from the first fuel supply gallery.

8. The swirler according to claim 1, wherein amounts of fuel ejected via the primary side injection opening in form of the stream and via the secondary side injection opening in form of the jet are independently variable.

9. A combustor assembly for a gas turbine engine, the combustor assembly comprising:

a combustion chamber having a longitudinal axis, and the swirler according to claim 1, wherein the swirler is arranged such that central axis of the swirler is aligned with the longitudinal axis of the combustion chamber.

10. A gas turbine engine comprising at least one of the combustor assembly according to claim 9.

11. The swirler according to claim 1, wherein the size of the secondary side injection opening is between 50% and 70% of the size of the at least one primary side injection opening.

* * * * *